INVENTORS.
AUGUST WINSEL
RALF WENDTLAND

United States Patent Office 3,597,275
Patented Aug. 3, 1971

3,597,275
PROCESS OF OPERATING FUEL CELL
August Winsel and Ralf Wendtland, Kelkheim, Taunus, Germany, assignors to Siemens-Schuckertwerke Aktiengesellschaft, Berlin and Erlangen, and Varta Aktiengesellschaft, Hagen, Westphalia, Germany
Filed July 13, 1966, Ser. No. 564,938
Claims priority, application Germany, July 15, 1965, S 98,219; Nov. 26, 1965, S 100,613; Dec. 10, 1965, S 100,880
Int. Cl. H01m 27/00
U.S. Cl. 136—86                7 Claims

ABSTRACT OF THE DISCLOSURE

An electrolysis or fuel cell which includes a plurality of porous electrochemical reactive electrodes positioned alternately with porous electrically non-conductive diaphragms; the pores of the diaphragms at the faces adjoining the electrodes have a median radius smaller than that of the pores at the faces of the electrodes. A special electrode for use in a fuel cell battery is also disclosed as well as a process for the operation of the electrolysis or fuel cell. The fuel or electrolysis cell does not require separate gas chambers for each cell of the gases.

---

The present invention relates to a galvanic fuel cell and to a fuel cell battery for the electrochemical reaction of reducible and oxidizable materials, and to an electrolysis cell in which porous electrodes and porous diaphragms are alternatingly arranged. The invention relates furthermore to a process for the operation of such fuel cells and batteries and electrolysis cells.

One type of known fuel cells which is operated with fuel material and oxidant comprises a porous electrode whose outer face adjoins a chamber containing the feed of fuel gas and another porous electrode whose outer face adjoins a chamber containing the feed of oxidizing gas, such as air or oxygen. Between the inner faces of the electrodes and in intimate contact therewith, there is provided an electrically non-conductive porous diaphragm which usually is a thin asbestos plate or an ion exchange membrane. The diaphragm may contain in its pores a liquid electrolyte so that the pores in the diaphragm form the electrolyte chamber between the electrodes or the diaphragm may perform itself the function of the electrolyte. As a result of the close contact between the electrodes and the diaphragm, the diaphragm serves as a cover layer on the adjoining inner faces of the electrodes, thus preventing the escape of the gases from the pores of the electrodes when the diaphragm contains the liquid electrolyte in its pores. This is due to the fact that the relatively high capillary pressure of the liquid electrolyte in the fine pores of the diaphragm resists the pressure of the gas and its displacement by the gas. Because of the necessity of having gas chambers adjoining the electrode, the arrangement in this type of fuel cell results in undesirably large size batteries, has the disadvantage that the side of the electrode adjoining the gas space is not electrically charged and therefore not electrochemically operative, and further permits the utilization of only the inner faces of the electrodes adjoininng the diaphragms for the electrochemical reaction.

Another type of fuel cell of the prior art for the operation with gaseous reactants does not use separate diaphragms but employs electrodes in which both faces are covered by a porous layer of very fine pore size. The extremely fine pores in these layers hold the electrolyte with a capillary pressure which is substantially higher than the pressure of the gaseous reactants in the pores of the electrodes and thus prevent the escape of the gases from the interior of the electrode into the electrolyte. This type of fuel cell permits the electrochemical utilization of both faces of the electrodes and does not require separate gas chambers. Instead the feed of the gaseous reactants is introduced at separate inlets provided at the edges of the electrodes. As is described in detail in copending U.S. Patent application Ser. No. 219,681 (German Patent 1,150,053), the larger pores of the electrode which have accordingly a lower capillary pressure are blown free of electrolyte under the pressure of the reaction gas and thus the gas reaches the location of the electrochemical reaction, i.e. the three phase zones electrode-electrolyte-gaseous reactant.

The presence of the porous cover layers of very fine pore size on the faces of the electrodes substantially reduces the ability of the various liquid components to pass through the cell and thus tends to reduce the electrochemical efficiency of the cell. This undesirable effect can in part be overcome by making the said cover layers very thin. The manufacture of such very thin, integrated layers is, however, very difficult because care must be taken that no holes or openings and breaks occur in these very thin cover layers in order not to defeat the very purposes of the cover layers.

It is therefore an object of the present invention to provide a fuel cell and a fuel cell battery, and an electrolysis cell respectively, which is compact, (i.e. which, for a defined space, has a greater surface of electrochemically active area (e.g. electrodes) available when compared with a conventional cell), which does not require separate gas chambers for each cell for the feed gases, permits the utilization of both faces of the electrodes for the electrochemical reaction and does not require the tedious and difficult manufacture of very thin, integrated cover layers of very fine pore size on the faces of the electrodes.

It is another object of the invention to provide a fuel cell or fuel cell battery, respectively, which is capable of a greatly increased electrical output.

Another object of the invention is to provide a new process for the operation of a fuel cell battery which permits great increase in the electrical output of the fuel cell battery.

Still another object of the invention is the provision of a process which permits to make the electrical resistance (Ohm's resistance) of the electrolyte to be large in relation to the inner electrical resistance (Ohm's resistance) of each of the fuel cells making up the battery without a substantial increase in the resistance to flow of the electrolyte from cell to cell.

The objects of the invention are achieved by a fuel cell or electrolysis cell which comprises a plurality of porous electrodes having two operative faces for the electrochemical reaction and a plurality of porous, electrically non-conductive diaphragms which are alternatingly arranged in sandwich fashion between and in intimate contact with the adjoining electrodes, the pores of said diaphragms in the layers directly adjoining the faces of the electrodes having median radius which is smaller than that of the pores at the faces of the electrodes. The relationship of the size of the pores of the diaphragm to that of the pores in the electrodes applies at least to the pores at the surface of the diaphragm but it may also apply to substantially all or all of the pores throughout the diaphragm. The electrodes are provided at their sides or edges (in contrast to faces) with at least one passage for the reactant (suitable inlet and outlet means). Preferably the fuel cell is provided with two terminal diaphragms.

The fuel cell battery of the invention comprises a plurality of these fuel cells so that a plurality of porous electrodes and a plurality of porous, electrically nonconductive diaphragms are alternatingly joined and pressed in contact, preferably with one of the diaphragms at each end, so that the number of the diaphragms exceeds by one the number of electrodes.

During the operation of the fuel cell and of the fuel cell battery of the invention, the pores of the diaphragms are filled with liquid electrolyte. The fuel and oxidant are advantageously gaseous (or they may be liquids) and are introduced through inlets provided at the edge of the electrodes.

The electrical output of the fuel cell and the fuel cell battery of the invention can be greatly increased by rinsing the outer pores of the electrodes with fresh or reconstituted electrolyte, i.e. spent electrolyte recombined with concentrated electrolyte to the desired concentration. This can be achieved by forced flow of the electrolyte through the pores of the electrodes and of the diaphragms. Such flow of the electrolyte can be achieved by the provision of forwarding or circulating means for the electrolyte such as a pump which produces a pressure differential between the two faces of the electrode or diaphragm, respectively. In an important embodiment of the fuel cell battery of the invention, one electrolyte chamber is provided at least at one of the terminal diaphragms and the said forwarding or circulating means produce a pressure differential between the electrolyte chamber and the faces of the opposite terminal diaphragm, or when there are provided two such chambers, between these two electrolyte chambers. In a preferred embodiment of the battery of the invention, the flowing electrolyte is introduced through an inlet at the edges of at least one of the porous dividing members, i.e the electrodes or the diaphragms so that the battery is subdivided into a plurality of sections for the circulation of the electrolyte. The flowing electrolyte is preferably introduced at an electrode or diaphragm located approximately in the center of the battery, so that the electrolyte flows toward the terminal electrodes and diaphragms members of the battery where it is collected and, after reconditioning, recirculated. If desired, the electrolyte may also be circulated in the opposite direction, so that it is introduced at the said terminal dividing members, preferably in the said electrolyte chambers and is removed at at least one of the dividing members, preferably at an electrode located approximately in the center of the battery, through an outlet for the electrolyte at the edge of the electrode.

The invention also comprises an embodiment of the battery, in which individual fuel cells are separated by a separatory disc of special construction with a passage for the electrolyte in form of a long channel which provides relatively low resistance to flow of the electrolyte and provides the electrical resistance of the thread of electrolyte which is considerably larger than the inner electrical resistance of the fuel cells making up the battery.

Amongst the various advantages, the fuel cell battery of the invention provides for highly efficient use of the electrodes since even the last of the electrodes thus arranged in series is operative even with very dilute electrolyte.

The invention will be more readily understood by reference to the accompanying drawings in which FIG. 1 is a schematic representation of a fuel cell in accordance with the present invention.

Figure 1:
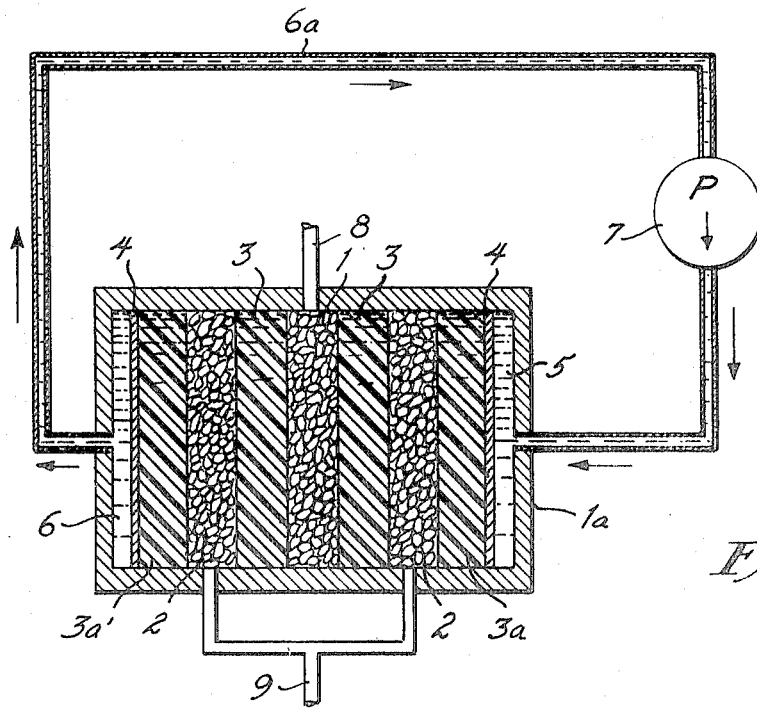

In the operation of the fuel cell of the present invention, the electricity which is produced in the pores of the electrode must be transported in a continuous thread of electrolyte from the pores where it is formed through the pores of the diaphragm and into the pores of the counter electrode. The difference in mobility of the ions, which are the carriers of the electricity, and the slow diffusion of the neutral components contained in the electrolyte result in a concentration gradient in the pores and along the path of the ions proportional to the current density. This produces the so-called concentration polarization which results in severe limitations of the current density of generated electricity with the resultant limitations in the output of electricity obtainable in a given fuel cell or battery. This disadvantage and these severe limitations can be readily overcome, in accordance with the present invention by forced flow of the electrolyte through the pores of the electrodes and diaphragms of the cell or battery, which eliminates the undesirable changes in the concentration of the electrolyte.

Forced flow of the electrolyte can be achieved by the production of a pressure differential between the electrolyte phases in or at the terminal diaphragms or across the cell or battery, respectively, e.g. by the use of suitable forwarding or circulating means such as a pump. In order to overcome the mechanical forces acting on the terminal diaphragms and to protect the thin diaphragms from these forces, it is of advantage to cover the outer, free faces of the terminal diaphragms by suitable porous supporting members preferably supporting plates, which have the necessary mechanical stability and which are advantageously made of a material which is suited to withstand the operating conditions and which are resistant to corrosion in the electrolyte system employed in each instance.

The pressure differential in the liquid electrolyte in the diaphragms adjoining the two opposite faces of a given electrode produces a flow of the electrolyte through the electrode without complete displacement of the operating gas or gaseous reactant from the pores of the electrode. Of course, the pressure differential must be held within certain limitations so as to avoid the flooding of the electrode on one hand and to produce a flow of desired rate on the other hand. The exact and most preferential pressure differential depends on many factors and on the particular design and dimension of the fuel cell or battery and its elements and above all it depends on the pore size of the surface layers of the diaphragms and of the electrodes and may be readily determined by the one skilled in the art. The pressure differential applicable in each instance depends, of course, also on the desired flow rate of the electrolyte through the electrodes which in part depends on the electrical output produced by the battery at any given time. Of course, the pressure differential and the absolute pressures employed are limited by the gas pressure within the electrodes and must be smaller than the limiting value at which the gas would be completely displaced in the pores of the electrode by the electrolyte, i.e. it must be smaller than the value of the pressure differential at which the electrodes would be flooded with electrolyte and at a minimum exceed the pressure created by the increase in volumn due to the water of reaction. The flow of the electrolyte through the fuel cell or battery may be continuous or discontinuous, e.g. pulsating. Generally, a continuous flow of the electrolyte is preferred.

As is apparent from the foregoing, the present invention concerns also a process which permits the elimination of the concentration polarization by the rinsing of the pores of the alternating electrodes and diaphragms contained in a battery with liquid electrolyte. This can be achieved in various ways, e.g. by the introduction or removal of the circulating or flowing electrolyte at or from the edges of one or more of the dividing porous elements of a fuel cell or battery, i.e. at or from the electrodes or the diaphragms.

In another embodiment of the process, a fuel cell or a fuel cell battery is used, in which there are provided at one or both ends of the cell or battery electrolyte chambers which are connected to the suction or pressure ends of electrolyte forwarding or circulating means.

The expedient of rinsing the electrodes and diaphragms with flowing electrolyte or the employment of forced flow of the electrolyte, respectively through the fuel cell or fuel cell battery, permit a greatly increased electrical output. The increase achievable by the invention depends on many factors such as the design and construction of the battery, materials used etc. and may in favorable situations greatly exceed an increase of 100 percent.

The basic principles underlying the present invention are demonstrated by way of example with reference to FIG. 1 of the accompanying drawing. Fuel cell 1a comprises one fuel electrode 1 and two oxygen electrodes 2 with diahragms 3 placed between the electrodes 1 and 2. Adjoining to the outer faces of electrodes 2 are provided in close proximity diaphragms 3a, which form the terminal diaphragms referred to hereinbefore. The outer free faces of terminal diaphragms 3a are stabilized by porous terminal supporting plates 4. At each end of the cell 1a is provided an electrolyte chamber 5 and 6 which chambers are connected over piping 6a and circulatory pump 7. Lines 8 and 9 serve to feed the presssrized fuel gas and oxidant gas to the respective electrodes. The conductors for the electricity generated in the fuel cell are of the conventional type and are omitted in this and the following drawings for reasons of clarity.

For the operation of the cell the electrolyte is circulated by pump 7 in the direction of the arrows, entering electrolyte chamber 5, passing through the porous supporting plate 4, and through the porous diaphragms and electrodes until it is collected in electrolyte chamber 6, from where it is returned to the circulating pump, preferably after removal of the undesired reaction products and adjustment of the concentration. It should be noted that the pressure differential between the electrolyte chambers 5 and 6 causes the electrolyte to pass through the electrodes containing the gas under pressure without completely displacing the gas. This can be explained by the fact that the electrodes contain not only the larger pores filled with gas but also communicating pores which are filled with electrolyte and which serve as the passageways to bring the electrolyte to all areas of the individual electrodes.

As is apparent from the foregoing, the fuel cell described hereinbefore may be built up to a fuel cell battery of any desired size by the addition of the desired number of electrodes and diaphragms.

In the fuel cell represented in FIG. 1 the number of the oxidizing electrodes exceeds by one the number of the fuel electrodes. Fuel cells or fuel cell batteries having this relationship of the number of oxidant and fuel electrodes are used with particular advantage in combination with alkaline liquid electrolytes. With this type of liquid electrolytes, the increase of the electrode area which is available for the reaction of the oxidant, is especially beneficial, because the oxidant electrode shows a considerably higher polarisation for the generated electricity than the fuel electrode.

As the size of the fuel cell battery of the present invention is increased, and especially with batteries which contain a large number of fuel cells arranged side by side, the resistance to flow of the electrolyte passing through the electrodes and diaphragms increases also. This is caused by the presence of the finely porous diaphragms. Furthermore, that portion of the electrolyte, which has already passed a number of electrodes is enriched with the reaction products of the electrochemical reaction such as water and becomes gradually more dilute in concentration of electrolyte. Accordingly, the invention provides also a new process which permits one to overcome this disadvantage and which makes it possible to divide the battery into a plurality of sections for the circulation of the electrolyte. In accordance with this process, the liquid electrolyte is introduced into and/or removed from the fuel cells at the edge of one or more of the dividing elements making up the battery, i.e. at one of the edges of one or more electrodes or diaphragms, respectively.

In a most convenient manner, the electrolyte is introduced in this embodiment of the invention into an electrode through the gas inlet which is provided, usually at the top edge of the electrode, so that the electrolyte flows downwardly in form of a thin surface layer or film of liquid along the inner wall areas of the larger, gas filled pores and where applicable also through the fine pores of the electrode which are constantly filled with electrolyte, if such fine pores are present in the gas filled areas of the electrode. In this manner, the electrolyte is evenly distributed over the whole area in the electrode.

Alternatively, it is also possible to introduce the gas and the electrolyte at separate places into the edge of the electrode. In this manner it is possible to select the most favorable place for the introduction of each of these materials. It is particularly feasible, to introduce the electrolyte at the larger areas of the edge of the electrode, so that the electrolyte is distributed over the largest possible area of the electrode. The electrolyte may also be introduced all around the edge portion of an electrode.

This embodiment of the process can be practiced with particular advantage in a fuel cell battery of the invention in which the electrode comprises at its edge, and preferably all around its edge, a porous area which has very fine pores of a size smaller than those in the working area of the electrode. There should be no larger sized pores in this edge area than the pore in the interior of the electrode. The pores in the said edge area must be so small that the capillary pressure in the fine pores in the edge area exceeds the gas pressure in the interior of the electrode, so that the gaseous fuel or oxidant cannot escape through this finely porous edge area. The electrolyte may be introduced through special inlet means into the said finely porous edge area which soaks up the electrolyte like a sponge. The fine pores of the said edge area are connected with and communicate with the very fine, electrolyte filled pores in the interior of the electrode as mentioned hereinbefore. Thus, the distribution of the electrolyte over the whole area of the electrode is achieved as before, through the fine electrolyte filled pores and in form of a fine film over the inner wall areas of the larger gas filled pores.

In the embodiment of the battery of the invention employing the introduction of the electrolyte through the edge of an electrode, two separate sections for the circulation of the electrolyte can be readily provided by the introduction of the electrolyte through an electrode located approximately in the center of the fuel cell battery and by the addition of an electrolyte chamber at each end of the battery with the connection of each of the said electrolyte chambers to the suction line of the forwarding or circulating means for the electrolyte.

This embodiment of the battery may also be operated in reverse manner. This can be achieved by connecting the pressure line of the forwarding or circulating means for the electrolyte to the said electrolyte chambers and the suction line to the finely porous edge portion of the special electrode described hereinbefore. In this case the latter may also be arranged approximately in the center of the battery to provide two separate circulating areas. Of course, in this embodiment of the battery using the reverse circulation, it is necessary to keep the gas inlet separate from the electrolyte outlet. With the provision of the hereinbefore described finely porous edge area in the electrode, the edge area serves as the electrolyte collecting area and prevents at the same time the escape of the operating gas from the electrode due to the high capillary pressure in the very fine pores of the edge area.

Instead of introducing or removing the electrolyte over a central electrode one may also introduce or remove the electrolyte over the edge of one or more of the diaphragms. For this purpose the edge of the diaphragm may be enclosed by a narrow chamber or channel for the collection of the electrolyte. As can be readily seen, the battery may be subdivided also in this manner into a plurality of separate circulating sections for the electrolyte, though, generally it is preferred to use for this purpose one or more of the electrodes.

Various specific embodiments of the fuel cell battery employing the just described principles and useful for the practicing of the process of the invention are shown by way of example in the attached drawings.

Figure 2:
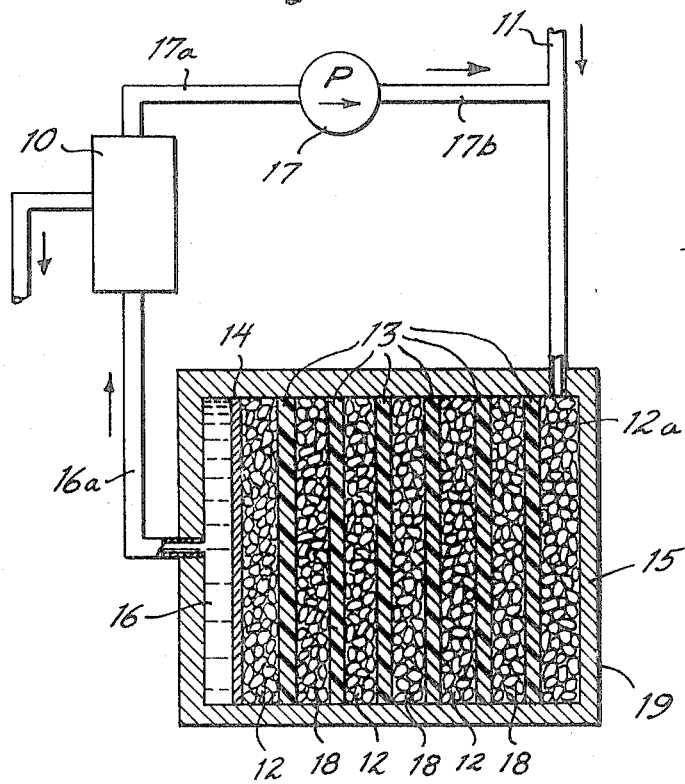
FIG. 2 is a schematic representation of an embodiment of the fuel cell battery of the present invention.

FIG. 2 shows a fuel cell battery 19 which comprises oxidation electrodes 12 and fuel electrodes 18 which alternate with diaphragms 13 in sandwich fashion. At the right end is provided oxidation electrode 12a which comprises inlet conduit 11 for the oxidant gas. The electrical power connections and the gas inlets for the remaining electrodes have been omitted for the sake of clarity and are schematically represented by housing 15.

At the left end, adjoining the last electrode 12, there is provided diaphragm 14 which adjoins electrolyte chamber 16. The latter is connected over conduit 16a to dehydration device 10 which in turn is connected over conduit 17a to the suction side of forwarding means 17 for the electrolyte. The pressure side of the latter is connected over conduit 17b to gas line 11 by a T-fitting.

The battery is operated by starting forwarding means 17, e.g. a pump, which introduces fresh electrolyte in measured quantities, preferably in quantities corresponding to the electrical output of the battery at any given time, into gas line 11. The fresh electrolyte is obtained by the removal of the reaction water from the circulated electrolyte in the dehydration device 10. The electrolyte flows, under the effect of the pressure differential between the gas pressure in the electrode 12a and the hydrostatic pressure of the electrolyte in the electrolyte chamber 16, successively through the electrodes 18 and 12 and the interdisposed diaphragms 13 and through terminal diaphragm 14 into electrolyte chamber 16, from where it is returned through line 16a to the dehydration device 10 for another cycle through the battery. The fuel gas and the oxidant gas are introduced into the respective electrodes through gas inlets at the edges of the electrodes and the electric current is recovered over conduits connected to the edges of the electrodes.

Figure 3:
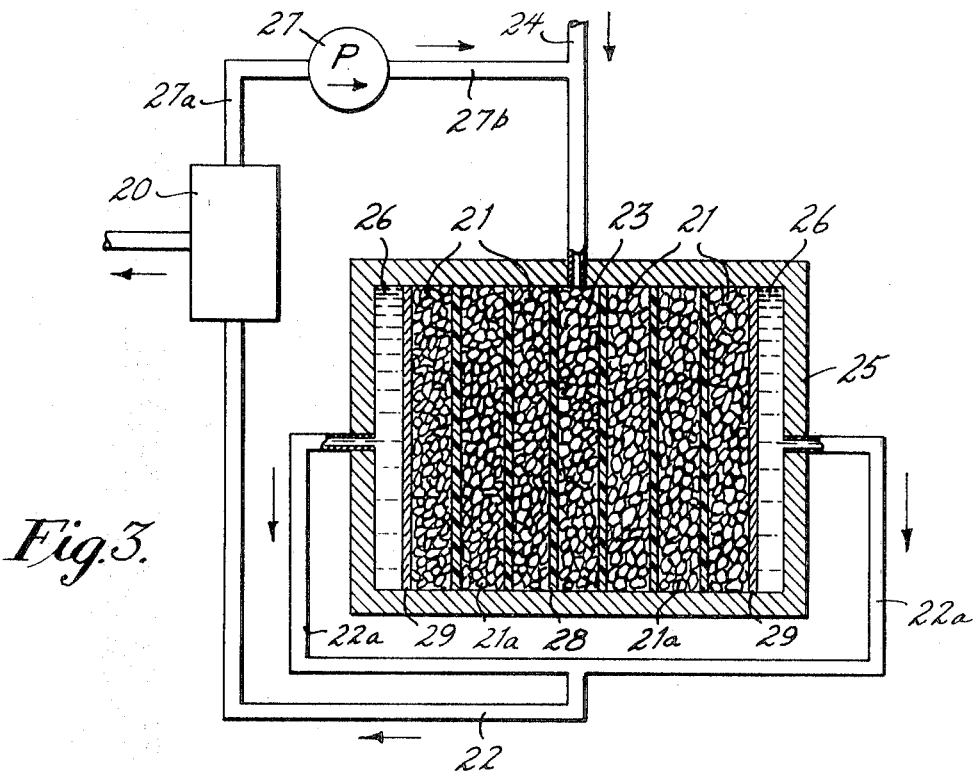
FIG. 3 is a schematic representation of another embodiment of the fuel cell battery of the invention.

A fuel cell battery having two separate sections for the circulation of the electrolyte is represented in FIG. 3 of the drawings. The battery comprises oxidation electrodes 21 and fuel electrodes 23 and 21a which are assembled side by side with diaphragms 28 disposed in between them in sandwich fashion. At each end is provided a terminal diphragm 29 together with a porous supporting plate (not shown). At the free outside faces of the terminal diaphragms 29 is provided on each side an electrolyte chamber 26 which chambers are connected over conduits 22a and conduit 22 to dehydration device 20 which in turn is connected over conduit 27a to the suction side of circulating pump 27. The pressure side of pump 27 is connected over conduit 27b into gas line 24 which connects into fuel electrode 23 in the center of the battery. Each of the remaining electrodes has a gas inlet at the edge and electric power connections which have been omitted for the sake of clarity. The gas lines and electrical connections are generally represented by housing 25.

In the operation of the battery, the electrolyte which has been concentrated by the removal of excess water in the dehydration device 20, is forwarded by the pump 27 through conduict 27b into the gas line 24 from where it flows into fuel electrode 23 in the center of the battery, under the effect of the pressure differential towards the ends of the battery, the electrolyte flows successively through the electrodes and diaphragms in both sections of the battery and towards both ends of the battery to be collected in electrolyte chambers 26 from where it is returned through suction lines 22a and 22 to the dehydration device 20. After concentration it is forwarded by pump 27 into the gas line 24 and so forth.

Figures 4, 5, 6:
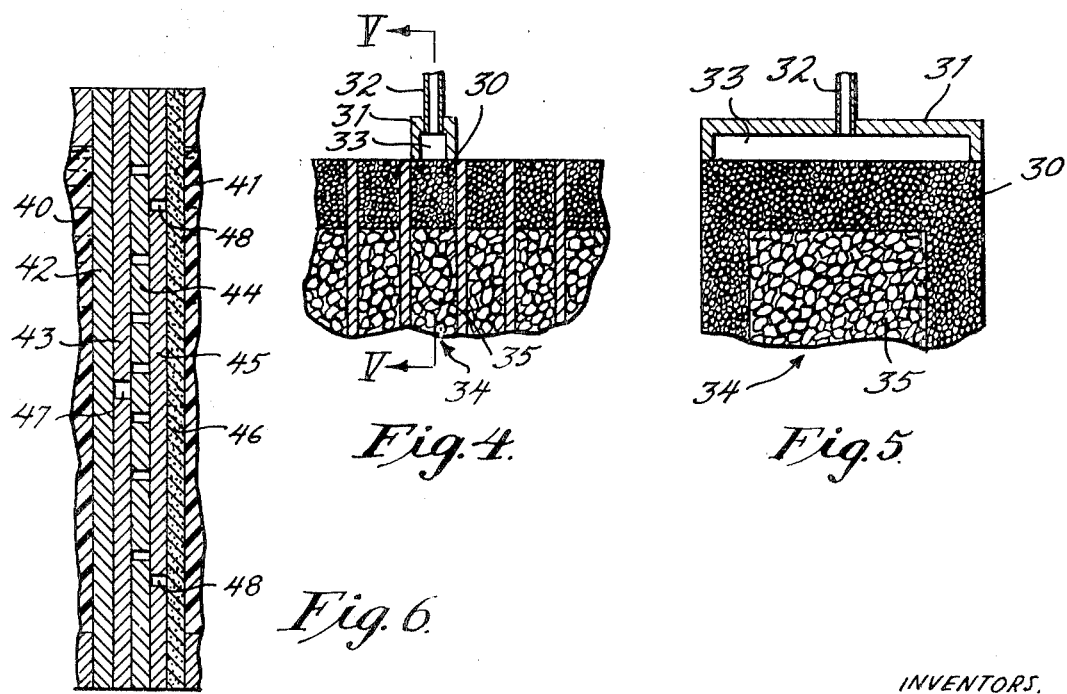
FIGS. 4 and 5 are fragmentary, schematic representations of an embodiment of an electrode having an inlet or outlet and porous edge portions for the introduction or removal of the electrolyte at the edges of the electrode, FIG. 5 being a vertical section taken along line V—V of FIG. 4.
FIG. 6 is a schematic, fragmentary view in section of a separatory disc with the coordinated elements forming a pack disposed between the electrodes of adjacent fuel cells in a battery.

Instead of introducing the circulated electrolyte into the gas line of an electrode, it may also be introduced into the electrode through a separate electrolyte inlet as has been explained hereinbefore. An example of an electrode having a separate electrolyte inlet at the top edge is illustrated in FIGS. 4 and 5 of the accompanying drawings. Electrode 34 comprises porous central portion 35 of regular pore size. This central portion 35 is surrounded by a finely porous edge portion 30 which is in capillary communication with said central portion 35 of the electrode. The pore size in this edge portion 30 is substantially smaller than that of the central section. The pores in this edge portion must be small enough to produce in these pores a capillary pressure of the electrolyte which is high enough to safely prevent the escape of the gas from the interior of the electrode through this edge portion. The top edge of the electrode is provided with channel-like member 31 which fully surrounds said finely porous edge portion 30 to form the fully enclosed chamber 33 which communicates with inlet 32 and with the finely porous edge portion 30. If desired, channel like member 31 and chamber 33 may be provided on more than one edge of the electrode and may be provided on all four edges of the electrode.

Electrolyte which is introduced under pressure through inlet 32 collects in chamber 33 from where it enters into and distributes in the fine pores of the edge portion 30. From there it flows into the central portion 35 of the electrode from where it passes successively through the neighboring diaphragms and electrodes in the above described manner. As stated hereinbefore, the flow of the electroylte may also be in the reverse, so that the electrolyte flows from the pores of the central portion 35 into the finely porous section 30 and through collecting chambers or channels 31 out through passage 32 which in this case serves as an outlet.

It has been found that the fuel cell batteries of the present invention produce excellent results, if the fuel electrodes consist of or contain activated metals of the subgroups VIII and Ib of the periodic system of the elements including: iron, cobalt, nickel, ruthenium, osimum, rhodium, palladium, platinum, iridium gold, silver and copper. They may contain these metals singly or a mixture. Especially good results are obtained with fuel electrodes which comprise Raney metals or alloys of Raney metals.

The activated metals can be produced by alloying the said metals with such metals as aluminum, magnesium or zinc. The alloy obtained in this manner is used as such, or in form of a fine powder, for the forming of the electrodes. The metal is then activated by the treatment of the preformed electrode with acids or bases, so that the aluminum, magnesium or zinc are dissolved and removed from the electrode. In this manner, fine pores are also formed in the individual particles of the alloy, which render the electrodes particularly suitable for use in the fuel cells and batteries of the present invention these very fine pores facilitate the passage of the streaming electrolyte through the gas filled electrodes.

Of course, the metals may also be activated prior to the manufacture of the electrodes. Such electrodes, which have been directly made from activated metals are likewise suitable for use in the fuel cells and batteries and in the process of the present invention.

The preferred oxidation electrodes for use in the fuel cells and batteries of the present invention are those which contain silver of large surface area. The activated silver may either be obtained by special precipitation methods from solutions which contain silver salts with the use of conditions which result in the precipitation of the silver in form of very fine particles, or it may be produced by the just described methods comprising the activation of the silver in an alloy in form of a powder or of a preformed electrode. Sometimes it is of advantage to add to the silver special activators.

The hereinbefore described fuel cell batteries and fuel cells, in which the electrodes comprise at their edges gas inlets may also be operated with liquid fuels and/or oxidants instead of the gaseous reactants described hereinbefore. Furthermore, the fuel cells or batteries of the invention may also be used, in conjunction with a source of direct current, for the electrolysis of aqueous solutions. The electrolyte circulating system described hereinbefore makes the batteries of the invention particularly suitable for this use. It is thereby possible to recover the gases formed in the electrolysis under pressure, because of the fact that the capillary pressure of the electrolyte in the pores of the diaphragms is higher than the gas pressure in the pores of the electrodes, as has been set out hereinbefore in detail.

Useful electrolytes for use in the process of the invention include, for instance, 5 N to 10 N potassium hydroxide or sodium hydroxide solutions, concentrated hydrochloric or sulfuric acid solutions, and other bases and acids of such strength.

Several of the fuel cells of the present invention may also be combined to a battery in which the individual fuel cells are operated in series. With this arrangement it is required that the electrolyte connection between two neighboring electrodes, being part of two different fuel cells, has as high an electrical resistance as is possible, in order to cause as little as possible interference with the rinsing of the electrodes with the flowing electrolyte, and in order to permit the keeping of the forwarding pressure within acceptable limits.

This can be achieved, in accordance with the present invention, by flowing the streaming electrolyte from one cell to the next cell through an elongated channel, said channel being so dimensioned that the resistance of the thread of electrolyte contained in said channel is large compared to the inner resistance of the cell, with at the same time the smallest possible resistance to flow of the electrolyte from cell to cell.

This process can be carried out with advantage in a battery, in which are provided separatory discs between the neighboring electrodes of adjoining different cells, and wherein the separatory discs contain at least one long channel for the passage of the electrolyte. In order to keep the size of the battery small, and to keep the electrodes closely spaced, said channel for the electrolyte has preferably the form of a spiral or meander, which are incorporated in said flat separatory disc.

The best dimensions of said channel for the electrolyte, i.e. its diameter "$2r$" and its length "$1$" can be readily calculated, so that the resistance to flow of the electrolyte does not exceed the acceptable value for a given fuel cell battery. As stated, the length "$l$" of the channel must be chosen such that the resistance "$R$" represented by the thread of electrolyte is substantially larger than the inner resistance of each of the fuel cells of which the battery is made up. The resistance to flow of the electrolyte is proportional to $r^{-4}$. Assuming that the specific resistance of the liquid electrolyte is $\rho$, the resistance R of the connecting thread of electrolyte can be calculated from the following equation $$R = \frac{\rho \cdot 1}{\pi \cdot r^2}$$

It is especially preferred that both electrodes which are adjacent to a given separatory disc have the same polarity, i.e. that both are either anodes or both are cathodes. In this case it is desirable to exclude any direct electrical connection between the electrodes, which can be advantageously achieved by constructing the separatory disc from an electrical non-conductor material. On the other hand, if the neighboring electrodes, separated by the said separatory disc have different polarity, it is of advantage to make the separatory disc from an electrically conductive material and preferably from a metal, so that both electrodes are directly electrically connected. Of course, to achieve this there is used for the diaphragms adjoining the separatory disc in this case also a material which is an electron conductor. In practice this can be readily achieved by the use of electrodes which have on one side a porous metallic cover layer of the requisite small pore size. Such layers may be readily produced from a metal powder. The electrodes containing these cover layers on one side, are inserted in the battery such that the metallic cover layer faces the separatory disc.

The principle of the separatory disc and its incorporation in a battery is schematically represented in FIG. 6 of the accompanying drawings. It is apparent from the foregoing that the parts used to build up the separatory disc arrangement may be made from plastics or from metals depending on the intended use. In the multilayer arrangement there are contained in this order, the terminal diaphragm 40 of a fuel cell, and an adjoining layer represented by collector plate 42. This plate contains passageways (not shown) which are designed to collect and conduct the flowing electrolyte with minimum resistance to flow of electrolyte to its central area. Next follows stop plate 43 which is impermeable to the electrolyte and which has at its center a hole shaped passage 47. In the center of the separatory disc arrangement is a so-called labyrinthian disc 44 which contains the above described long channel or channels (not shown) which extend from the central area to the outerlying areas. The next member in the arrangement is another impermeable plate 45 with hole shaped passageways 48 provided in a position opposite the places of termination of the long channel or channels. The next member is a porous collector disc 46 which is followed by the terminal diaphragm 41 of the neighboring fuel cell.

As is evident diaphragms 40 and 41 may also be replaced by the above described porous metallic faces of the electrodes if their use is indicated.

For the operation of the separatory disc just described, electrolyte flows from the left to right passing in a wide cross section path over the whole area of diaphragm 40. It is then collected by the collector plate 42 and led to the center where it passes through passage 47 into the long winding channel of the labyrinthian disc which it leaves at passages or passages 48 of plate 45 and from where it flows into collector disc 46 which redistributes the flowing electrolyte over the whole surface area or face of the following diaphragm 41, from where it flows to the adjoining electrode in the next cell.

It will be apparent that while the invention has been described for the most part with specific reference to the various embodiments of the fuel cell and fuel cell battery that the invention also includes the methods of operating the fuel cell and fuel cell battery, and it is believed that the method is apparent from the description contained herein.

Many widely different embodiments of this invention may be made without departing from the spirit of the invention. The invention is not limited to the specific embodiments shown herein except as defined in the appended claims.

We claim:

1. During the process for the operation of a fuel cell battery for the production of electricity which battery comprises a plurality of porous electrodes each having small and large pores and two electrochemically reactive faces and being arranged alternatingly between and extending for substantially the entire surface of adjoining porous, electrically nonconductive diaphragms, both faces of a diaphragm, the pores of said diaphragms at least in the layers directly adjoining the faces of the electrodes having a median radius which is smaller than that of the pores at the faces of the electrodes, which process comprises passing sequentially through said electrodes and diaphragms a flow of liquid electrolyte while introducing fuel and oxidant gases into the respective electrodes.

2. The process of claim 1 for the operation of the fuel cell battery comprising a plurality of fuel cells in series which process comprises forwarding electrolyte from each cell to the next cell through a perforated electrolyte-permeable labyrinthian disc through which the electrolyte passes as a long thread, which thread has such a dimension that the resistance to flow of the electrolyte is selectively low and the electrical resistance of the said thread of electrolyte is greater than the inner resistance of each of the fuel cells.

3. The process of claim 1 in which the flow of the electrolyte is achieved by producing a pressure differential between the ends of the battery and the place of introduction of the flowing electrolyte into the battery.

4. The process of claim 1 in which the flowing electrolyte is introduced through a passage at the edge of at least one of the electrodes.

5. The process of claim 1 wherein the electrolyte passes through a terminal electrolyte chamber after passage through the terminal electrode.

6. The process of claim 1 in which the electrolyte exists the battery through two electrolyte chambers positioned at the opposite ends of the battery.

7. The process of claim 1 wherein the electrolyte is recirculated to the fuel cell battery.

References Cited

UNITED STATES PATENTS

| | | | |
|---|---|---|---|
| 3,055,964 | 9/1962 | Solomon et al. | 136—20X |
| 3,057,942 | 10/1962 | Smith et al. | 136—6 |
| 3,057,943 | 10/1962 | Strauss | 136—6 |
| 3,172,783 | 3/1965 | Stanimirovitch | 136—6 |
| 3,174,878 | 3/1965 | Peters | 136—6 |
| 3,265,534 | 8/1966 | Ruetschi | 136—6 |
| 3,342,639 | 9/1967 | Harivel | 136—28X |
| 409,366 | 8/1889 | Nond et al. | 136—86 |
| 2,070,612 | 2/1937 | Neiderreither | 136—86 |
| 2,175,523 | 10/1939 | Greger | 136—86 |
| 3,035,998 | 5/1962 | Sommer et al. | 136—86X |
| 3,311,507 | 3/1967 | Dittmann et al. | 136—86X |
| 3,316,167 | 4/1967 | Clarke, Sr. et al. | 136—86X |
| 3,369,938 | 2/1968 | Kroeger et al. | 136—86 |

ALLEN B. CURTIS, Primary Examiner